July 12, 1966 R. R. COLEMAN, JR 3,260,519
DOCUMENT ADVANCING MEANS
Original Filed May 20, 1963
10 Sheets-Sheet 8

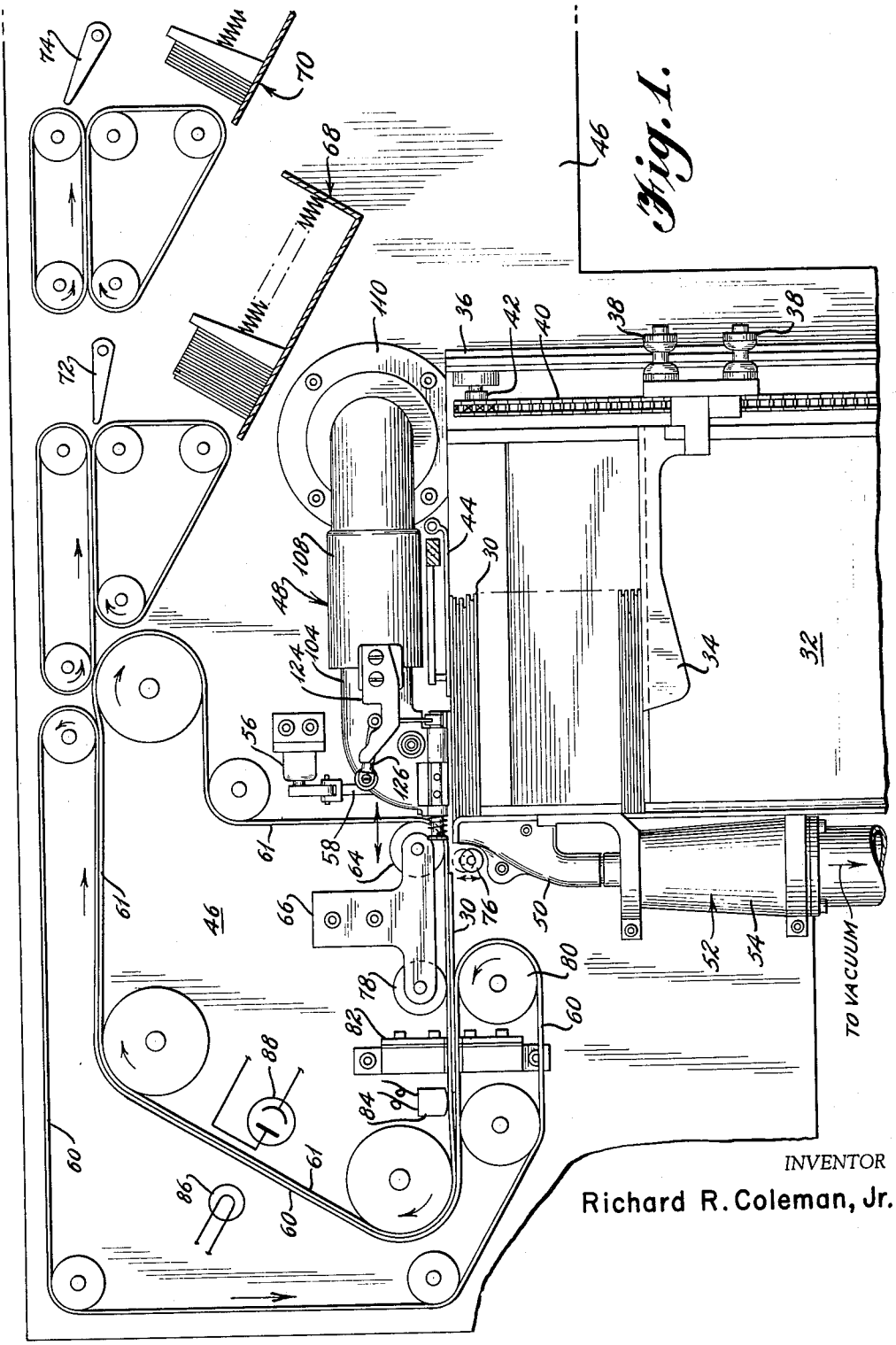

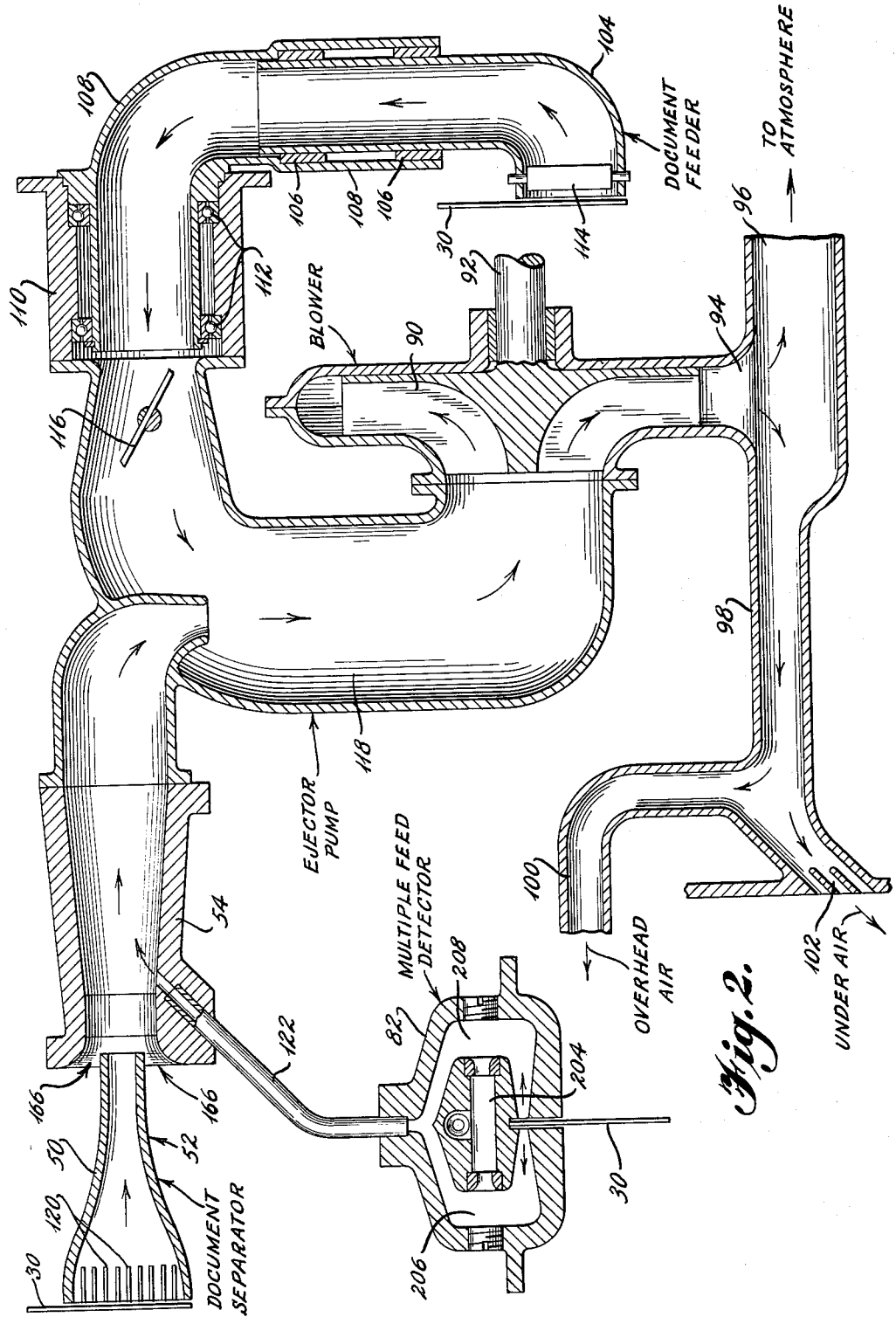

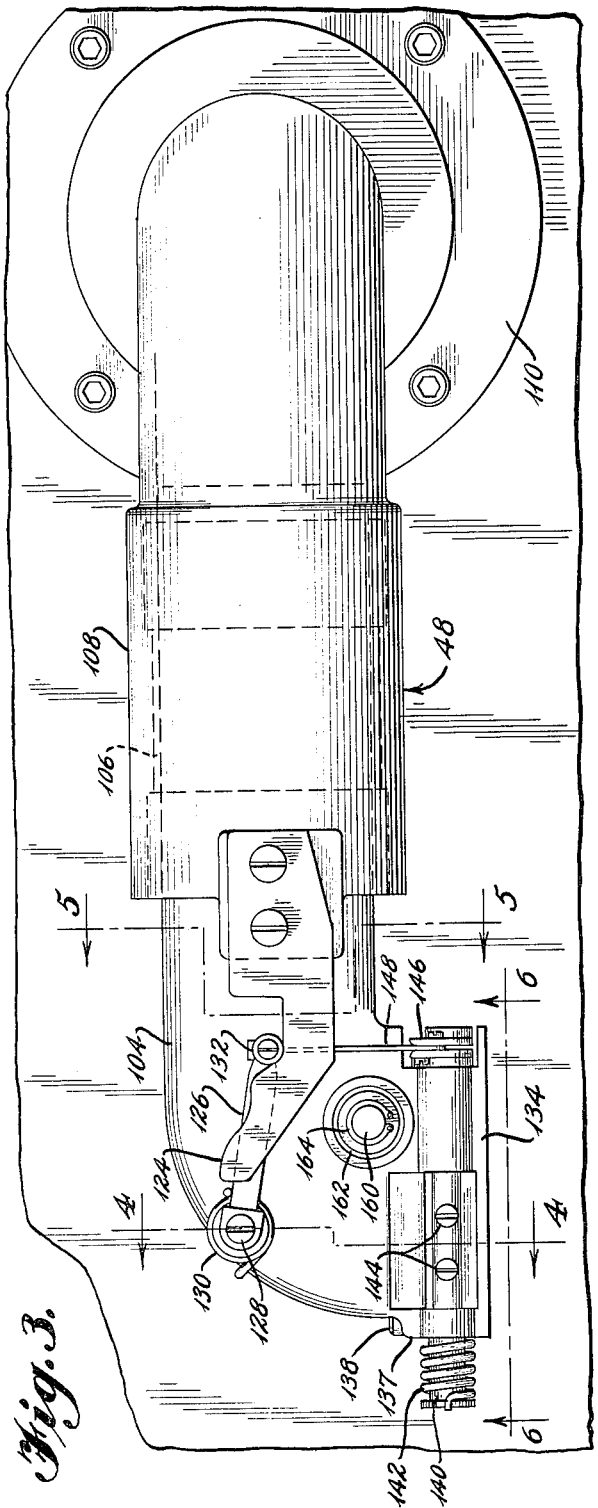
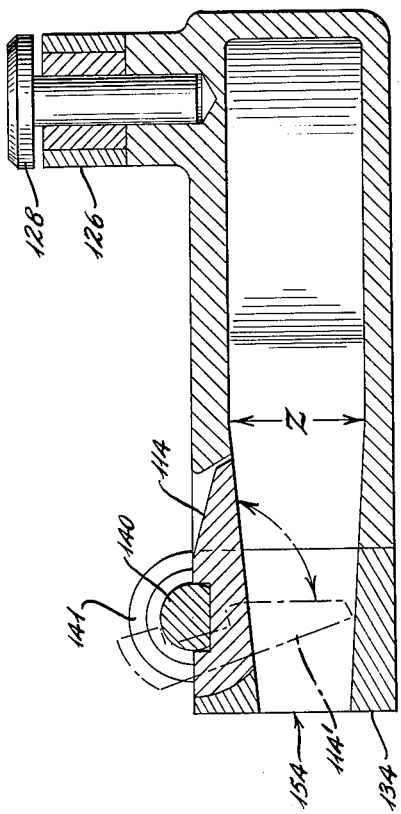

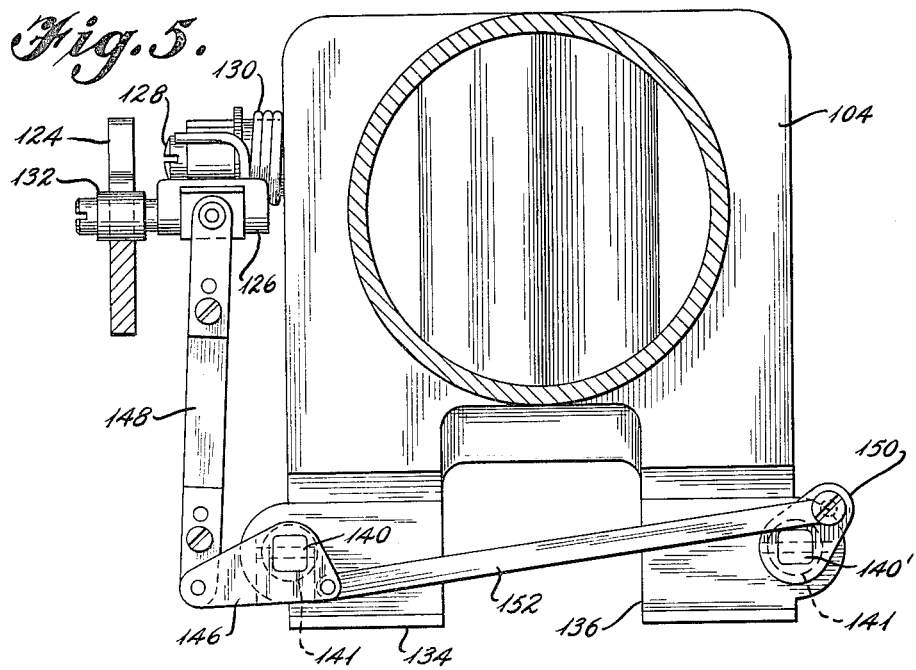
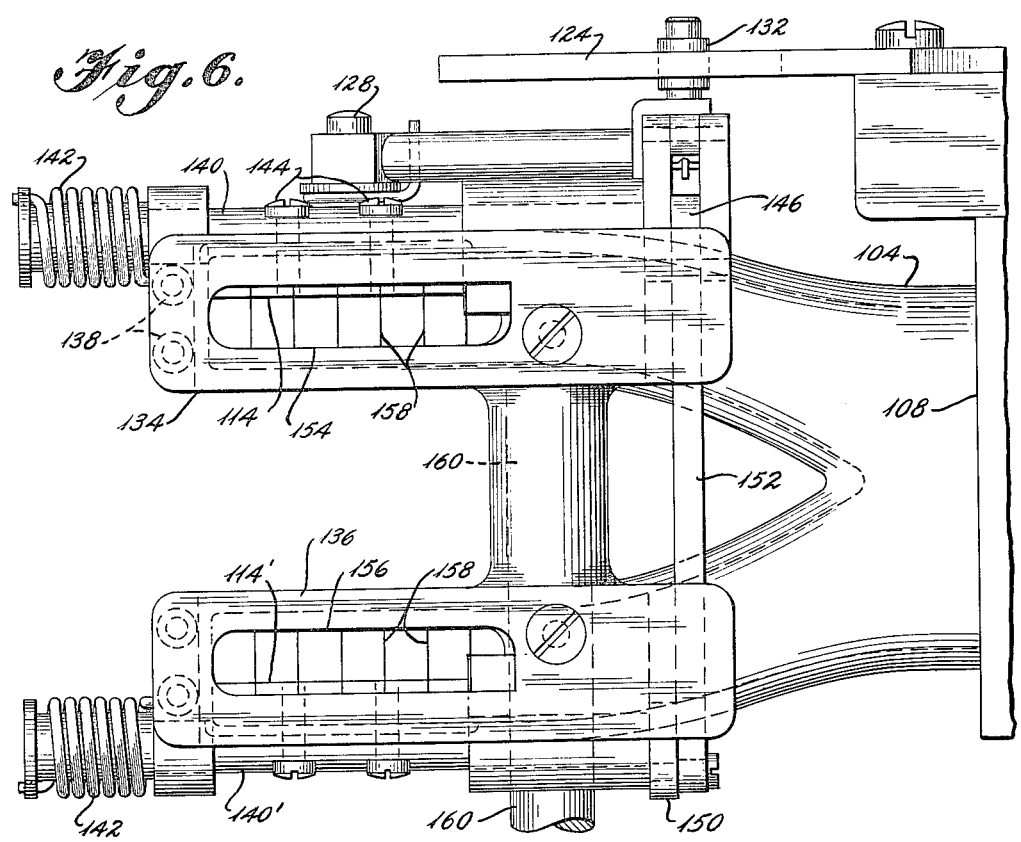

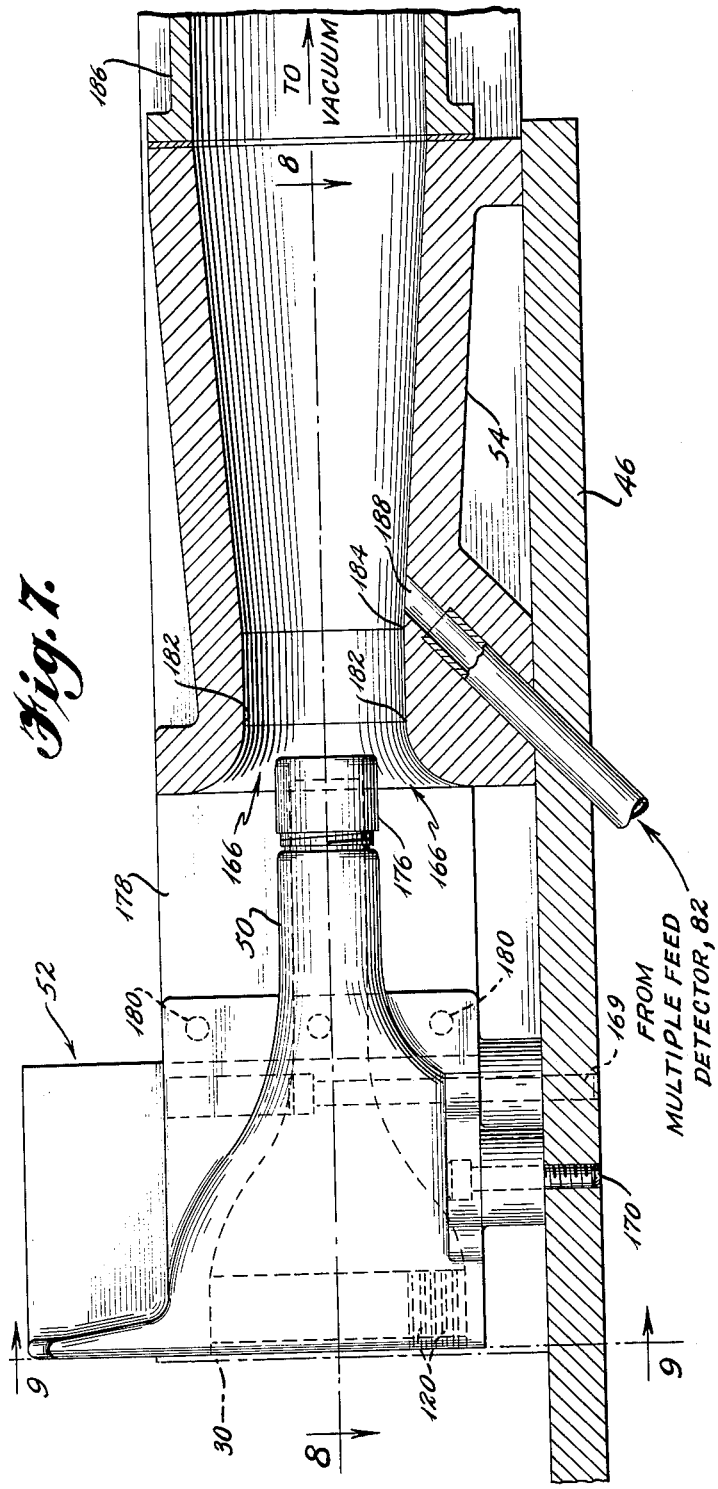

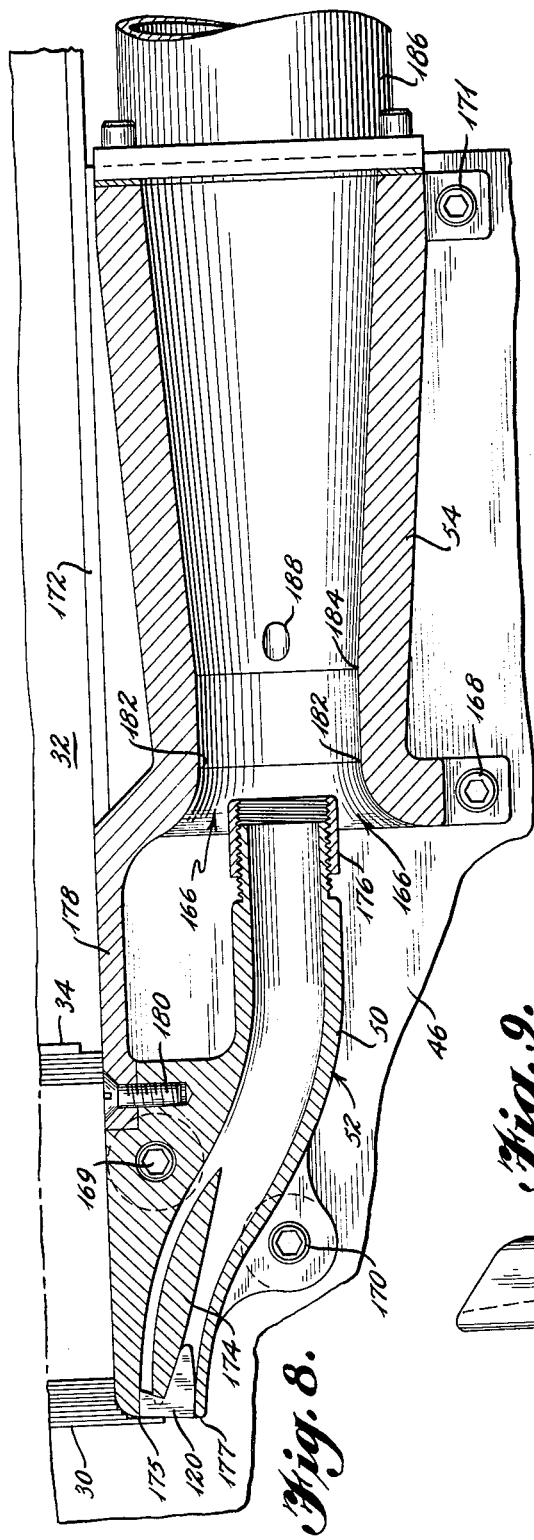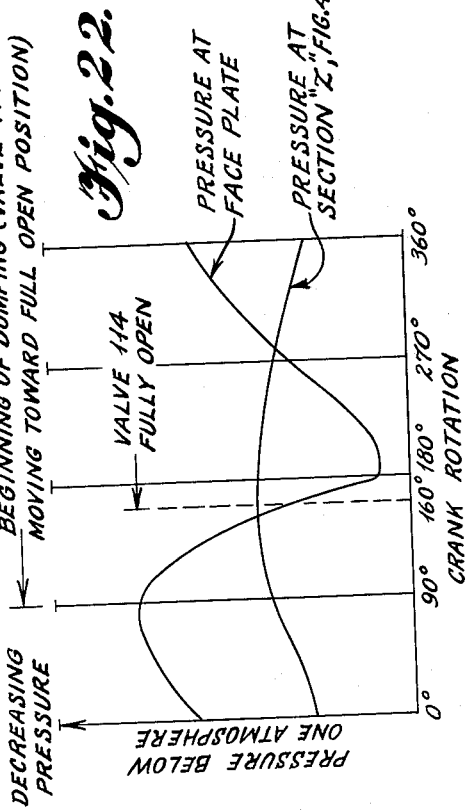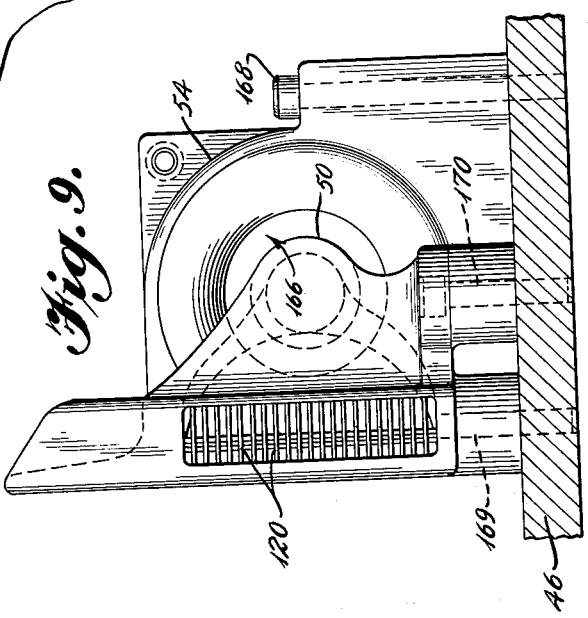

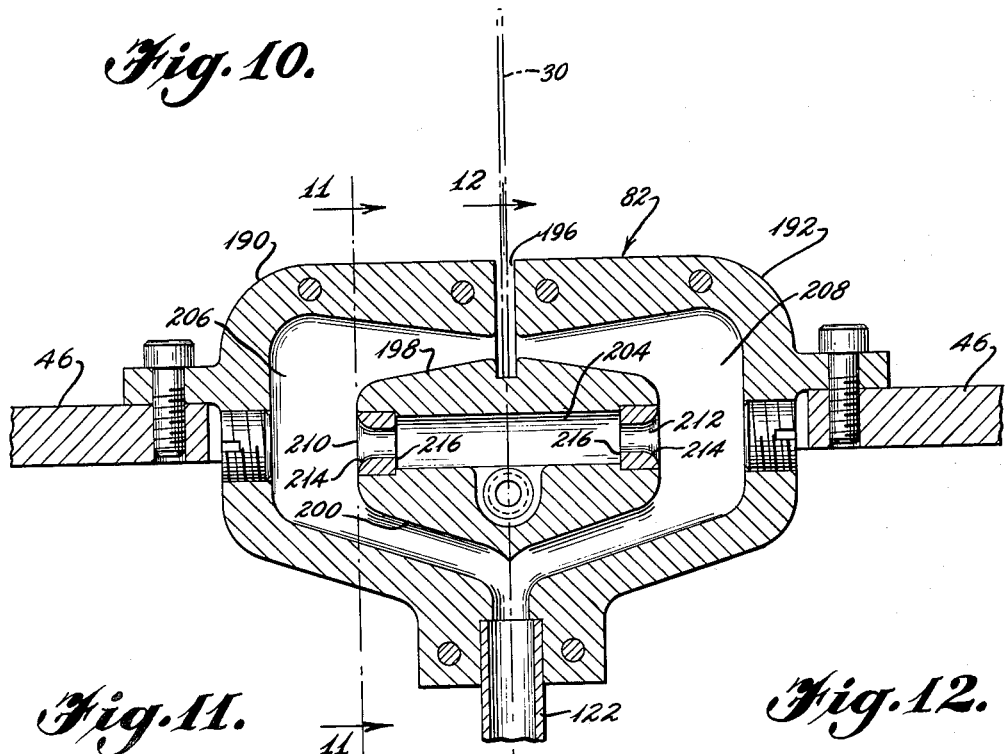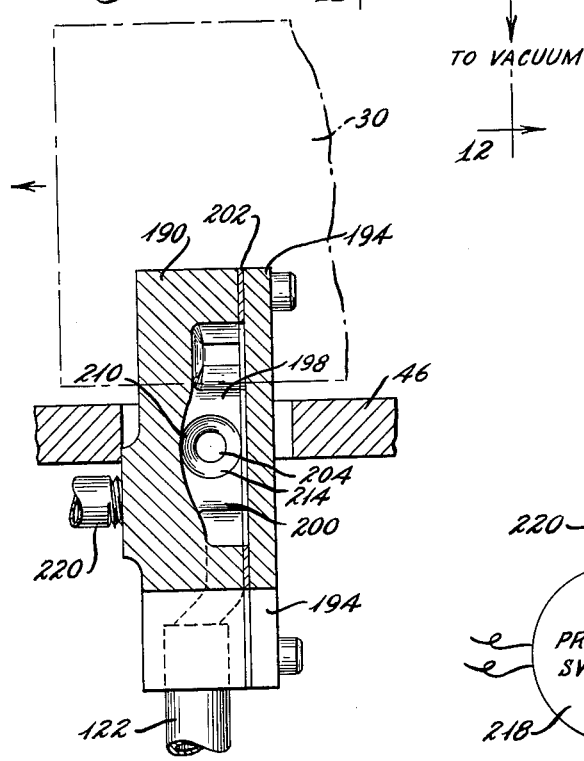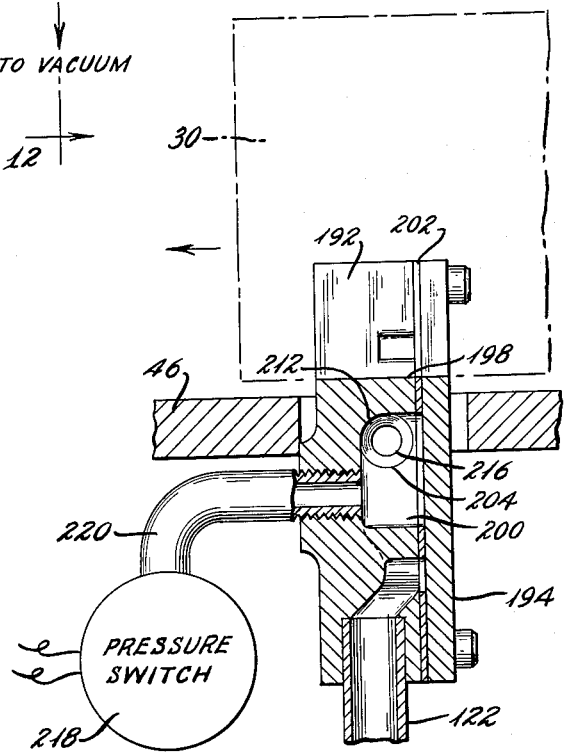

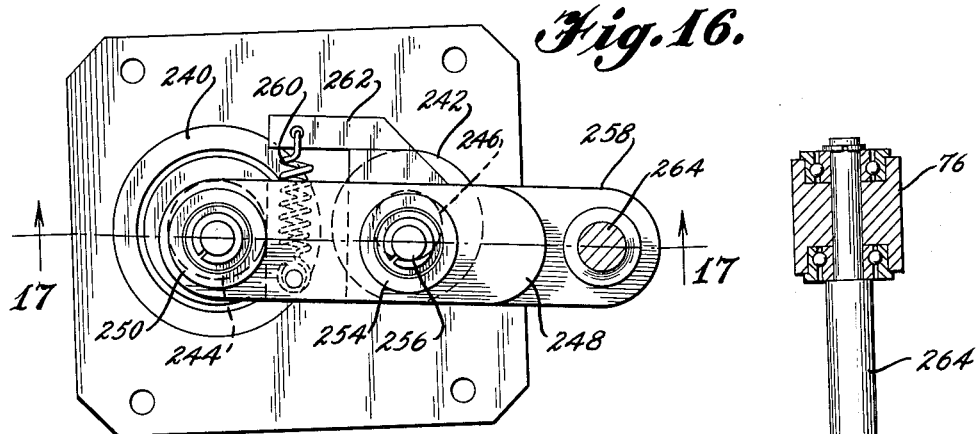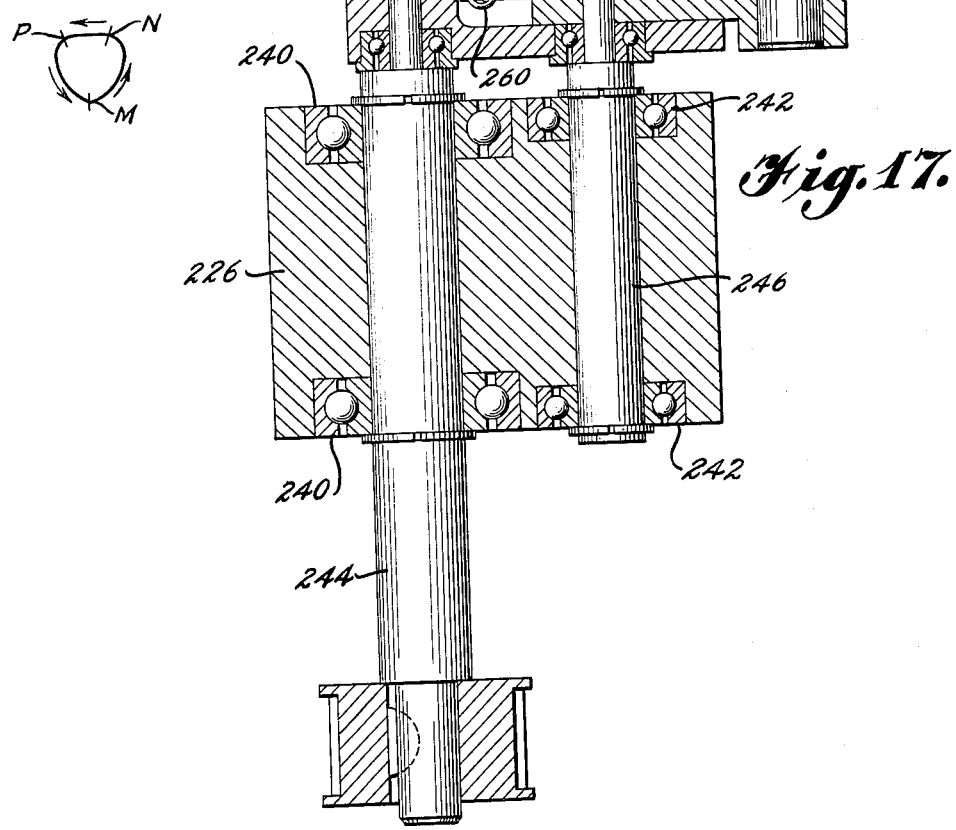

July 12, 1966  R. R. COLEMAN, JR  3,260,519
DOCUMENT ADVANCING MEANS
Original Filed May 20, 1963  10 Sheets-Sheet 10
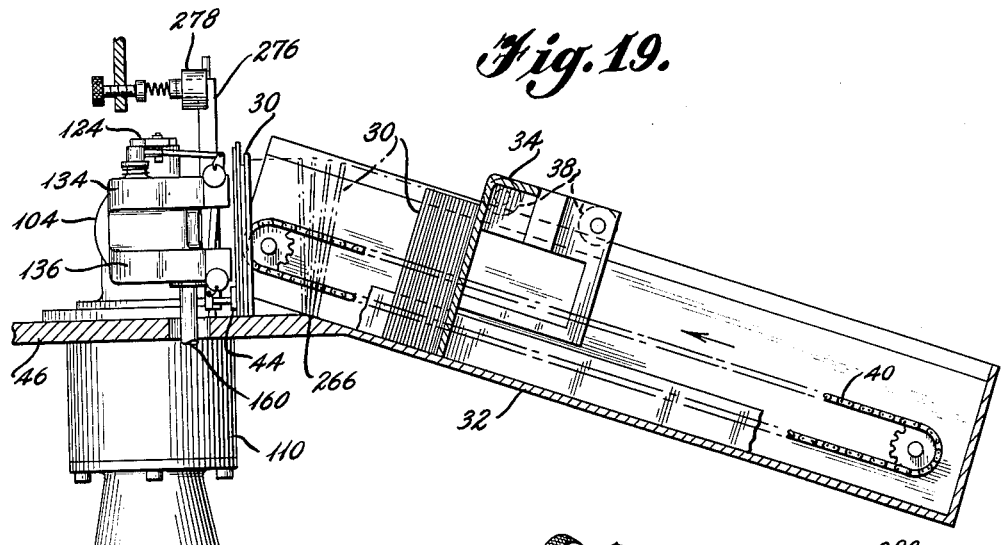
Fig. 19.
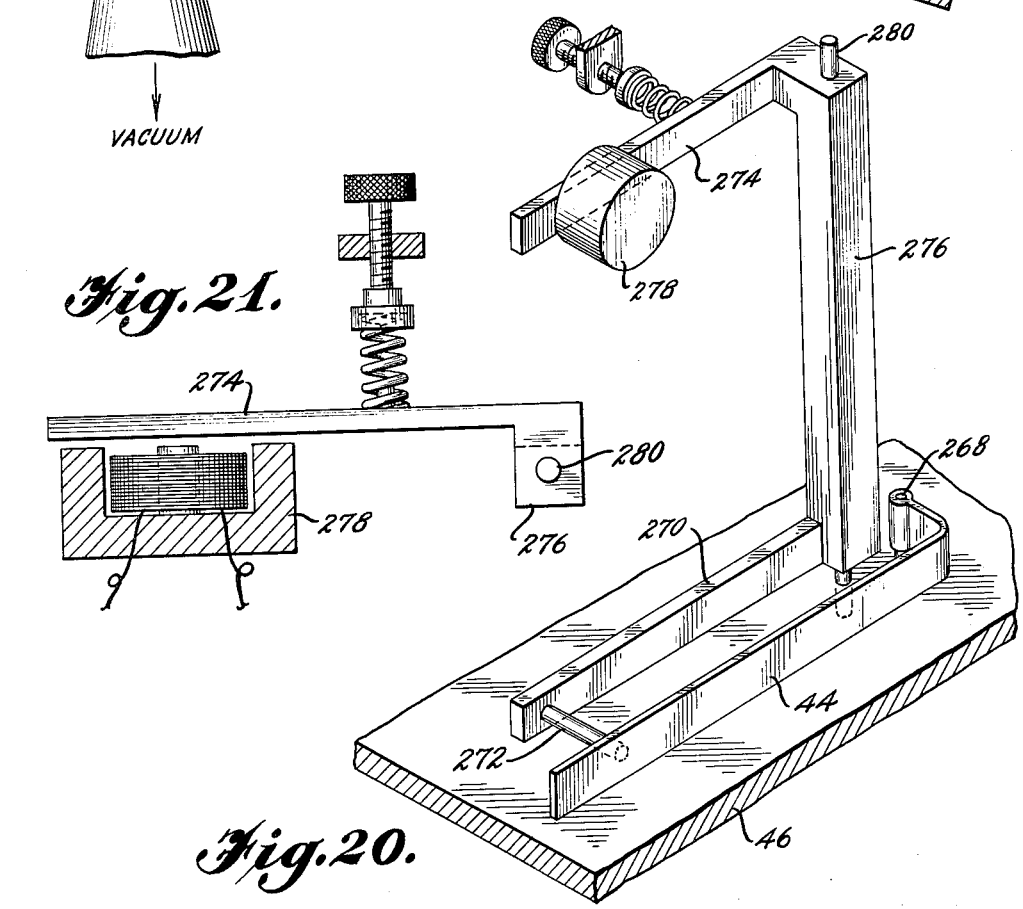
Fig. 21.
Fig. 20.

UNITED STATES PATENT OFFICE 3,260,519
Patented July 12, 1966

3,260,519
DOCUMENT ADVANCING MEANS
Richard R. Coleman, Jr., Devon, Pa., assignor to Sperry Rand Corporation, New York, N.Y., a corporation of Delaware
Continuation of application Ser. No. 281,654, May 20, 1963. This application Mar. 1, 1965, Ser. No. 441,400
20 Claims. (Cl. 271—5)

This invention relates to document feeding and advancing means and more specifically to a high speed, vacuum operated document sorter.

This application is a continuation of the previously filed and copending application entitled Document Advancing Means by Richard R. Coleman, Jr., Ser. No. 281,654, filed May 20, 1963, and now abandoned.

The art of paper handling is one of the oldest arts known to engineering. A well known means for removing articles from a stack of articles is by employment of the vacuum principle. In this type of operation, means are utilized to draw air into a feeder nozzle and when the feeder nozzle is caused to cyclically engage the top or first article from the stack, the article will be drawn against the feeder nozzle. When the article is drawn against the feeder nozzle, the pressure within the feeder nozzle drops below atmospheric which causes the article to remain against the nozzle as the nozzle oscillates in a cyclic fashion to deliver the article to a type of transport means. When it is desired to release the article from the feeder nozzle, the article may be securely gripped and forced away from the nozzle or the pressure within the nozzle head may be caused to rise thus decreasing the differential pressure and permitting the feeder nozzle to disengage the article.

These prior art devices operated at relatively slow speed, in the range of 100 to 200 cycles or documents per minute. With the advent of the high speed document sorter, it was found that, although the general laws relating to fluid mechanics were applicable, the structures and means to advance and to read documents in the range of 1500 or more documents per minute, required greater precision and the increased application of engineering principles, principally in the area of fluid mechanics.

The subject matter of the present invention relates to a high speed document processor such as a document processing device for feeding and sorting bank checks, deposit slips, etc. The requirement of such a high speed document processor is that it be able to serially feed intermxied documents of varying dimensions and weights and without mutilating the documents. In addition, to be highly successful, the processor must be capable of feeding somewhat mutilated, torn, and otherwise nonperfect documents.

In high speed document feeding utilizing the vacuum principle, pressure waves were set up each time the nozzle port was closed off by engagement with a document. These pulsations tended to decrease the stability of the device, increased the noise level, and, in general decreased the effective feeding rate, and what is more important caused the entire feeding system to malfunction with a consequent decrease in the efficiency of the operation. It became evident then, that if a truly efficient and high speed operation was to be obtained, it was desirable that the pulsations (pressure waves) be eliminated or substantially reduced. Other systems for grasping documents are known such as an arrangement of feed belts which frictionally engage the document and cause its transfer to a remote position. However, this type of document feeder has serious limitations because of its inability to handle intermixed documents of varying weights of paper. If the belts are adjusted to feed the thinner or lighter weights of paper, then difficulty is encountered in feeding the heavier weights of paper and vice versa. The result is that document jams often occur with the inevitable mutilation of the documents.

On the other hand, the vacuum feeder of the present invention is capable of feeding very thin documents (tissue) as well as very heavy documents, such as punched cards, without the resulting document jams and mutilation as described for the systems operating on the belt principle.

To better understand the nature of the aforementioned pressure waves that were set up, it may be helpful to discuss a few basic physical propositions. The term "fluid" (the fluid is air in the present invention) may be characterized in different ways, as by molecular spacing and activity. In a fluid, the spacing between molecules is greater than in a solid. Similarly, the range of motion of the molecules in a fluid is greater than that in a solid. A more precise and usual definition of the word "fluid" can be formed on the basis of action under stress. A fluid is a substance which when in static equilibrium cannot sustain tangential or shear forces. A fluid yields continuously to tangential forces, no matter how small be the forces. Common experience shows that sound or pressure waves travel through fluids and such pressure waves depend upon the compressibility or elasticity of the fluid.

Shear force, tensile force, and compressive force are the three kinds of force which may act on any body. Fluids move continuously under the action of shear or tangential forces. Fluids will support tensile forces to the extend of the cohesive forces between the molecules. Since such forces are usually very small, the practice in many engineering problems is to assume that a fluid cannot sustain a tensile stress. It is well established that fluids are capable withstanding a compressive stress, which is usually called pressure. The vacuum system of the document sorter of the present invention operates with a fluid (air) under various pressures (many of which may be negative or below atmospheric) according to the function to be performed. In the document feeder arm, air is drawn into the arm and at the appropriate time the arm is brought into engagement with the first document of the stack of documents. The document is then drawn against the feeder nozzle, which position of the document now closes off the vacuum ports. As a result, an abrupt drop in pressure within the feeder arm occurs. If means are not employed to compensate for the sudden change in pressure, a pressure wave is generated through the system which causes an increase in the noise level, decreased efficiency, document jams, excessive heating of the elements, etc.

In the present invention, means are utilized to stabilize the pressure in the feeder nozzle which action mitigates the adverse effects previously set forth. In addition, a vacuum separator is utilized in the invention which insures the seriatim or single feed of the documents. Like the document feeder, the document separator operates on the vacuum principle and when a document is closing off the entrance ports for the fluid, a sudden drop in pressure occurs in the immediate area near the document and within the separator. The document separator is constructed in such a manner that the pressure within the system also tends to assume stability.

Accordingly, the principal object of the present invention is to improve document processors.

A further object of the present invention is to improve document processors of the vacuum type.

A further object of the present invention is to establish the stability of the document processor by decreasing vibrations of the system.

A further object of the present invention is to decrease the power required to operate the system.

A still further object of the present invention is to smooth out the flow of air in a vacuum type document processor system so that the pulsations and vibrations are substantially reduced.

A further object of the present invention is to eliminate the need of flexible couplings between certain elements of the system and replace these couplings with rigid connections.

A still further object of the present invention is to separate and isolate the document feeder and document separator elements of the system.

A further object of the present invention is to improve document feeders of the vacuum type by consequent reduction of damage to documents of low tensile strength and high flexibility.

A still further object of the present invention is to stabilize the air flow in a vacuum document feeder.

A further object of the present invention is to improve document separators operating on the vacuum principle.

A further object of the present invention is to stablilize the passage of air through a vacuum document separator.

A further object of the present invention is to improve multiple item detectors.

A further object of the present invention is to increase the response time of multiple item detectors.

Other objects of the invention will be pointed out in the following description and claims and illustrated in the accompanying drawings, which disclose, by way of example, the principle of the invention and the best mode which has been contemplated, of applying that principle.

The document processor of the present invention will serially advance documents from an input hopper to a pair of transport belts forming the document path or way. The documents are then separated from the flexible belts into the desired output pocket. The document feeder is comprised of an extending arm which follows a substantially D-shaped path. One end of the document feeder arm contains a plurality of ports through which air is passed so that this end of the arm may engage and hold a document. As soon as a document closes off the intake port of the feeder arm, a substantial drop in pressure within the arm would occur if means were not employed to stabilize or prevent the great drop in pressure. In the feeder arm of the present invention, a valving arrangement coupled to the feeder arm will cause valves to open at the moment that the document is grasped so that auxiliary ports are now available to continue the flow of air through the feeder arm. The amount of air permitted to enter the auxiliary ports is not so great that the document falls from the primary ports but is of a sufficient magnitude that the document is retained on the face of the feeder arm while the pressure is maintained substantially constant within the feeder arm.

As the feeder arm advances the documents toward the flexible belt transport system, the documents are caused to pass in front of a document separator. The document separator serves to permit only a single document to pass into the transport system. Multiple documents are held by the document separator and will be picked up serially during succeeding feeding cycles. A similar problem occurs with the document separator as with the document feeder. When the ports in engagement with the document are closed off by a document, then a great drop in pressure would occur. These great drops in pressure (increased vacuum) cause pulsations and waves to be set up in the system which cause vibration, decrease the stability, increase the noise level, and in general decrease the efficiency of the system. In the document separator, a main chamber, of such physical dimensions to produce an acoustical resonant frequency which is many times greater than the frequency of the document processing rate, in engagement with the documents, is directed to and pneumatically coupled to a secondary chamber, which secondary chamber is open to the atmosphere to permit the intake of air. While a substantial decrease in pressure takes place within the primary chamber in engagement with the documents, the pressure in the secondary chamber remains substantially constant, and, it is the constant pressure in the secondary chamber which the blower system sees.

As the documents are advanced to the flexible belt system, a timing cam will oscillate and engage the document by forcing it against one of the belts and causing the release of the document from the document feeder and the document separator. As the document advances along the document path, it is advanced through a multiple item detector which detects for the presence of two or more documents. In the event that multiple items are fed, which may occasionally occur, they will be detected by the multiple document detector whose output may be utilized to inhibit the system or cause the multiple items to be directed to a multiple item output pocket.

Reference is now made to the accompanying drawings which show a preferred form of the invention and on which reference characters designate like parts referred to in the following description.

In the drawings:

FIGURE 1 is a plan view of the document processor of the present invention;

FIGURE 2 is a schematic of the air and vacuum system of the present invention;

FIGURE 3 is a top view of the document feeder or feeder arm of the present invention;

FIGURE 4 is a sectional view taken along the lines 4—4 of the FIGURE 3;

FIGURE 5 is a sectional view taken along the lines 5—5 of the FIGURE 3;

FIGURE 6 is a sectional view taken along the lines 6—6 of the FIGURE 3;

FIGURE 7 is an elevation view, partly in section, of the document separator of the present invention;

FIGURE 8 is a cross-sectional view taken along the lines 8—8 of the FIGURE 7;

FIGURE 9 is an end view taken along the lines 9—9 of the FIGURE 7;

FIGURE 10 is a cross-sectional view of the multiple feed detector of the invention;

FIGURE 11 is a sectional view taken along the lines 11—11 of the FIGURE 10;

FIGURE 12 is a sectional view taken along the lines 12—12 of the FIGURE 10;

FIGURE 16 is a plan view of the document cam;

FIGURE 17 is a sectional view taken along the lines 17—17 of the FIGURE 16;

FIGURE 18 is a diagram showing the path of the document cam of the FIGURE 16;

FIGURE 19 is an elevation view, partly in cross-sectional, of the input document tray and the document feeder;

FIGURE 20 is a perspective view of the document sensing means;

FIGURE 21 is a view of the document sensing arm of the FIGURE 20; and,

FIGURE 22 is a diagram showing the approximate relationship of the pressure versus the stroke of the document feeder arm.

Figure 13:
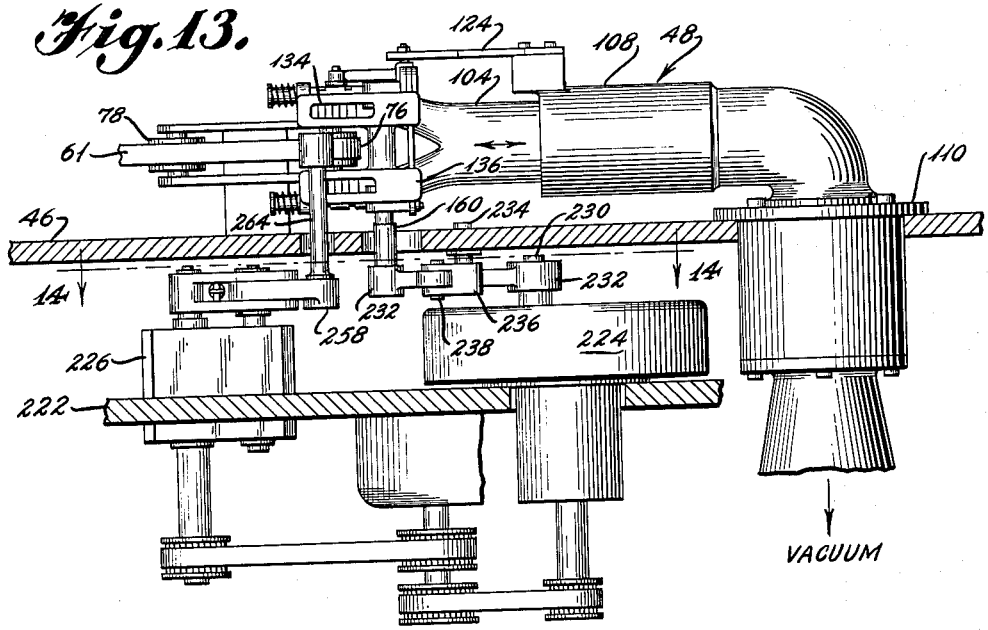
FIGURE 13 is a side elevation of the document feeder and the propelling means for the feeder.

As shown in the plan view of FIGURE 1, the documents 30 are supported by a document tray indicated generally at 32. The documents are advanced toward the feeding area by a backup plate 34 which is supported partially by a rail 36 and guided by a pair of rollers 38. A drive chain 40 passes around a sprocket 42 and is secured to the backup plate 34 to advance the documents 30 at a rate determined by the force applied by the documents 30 against a sensing finger 44, which will be described in detail with reference to the FIGURES 19, 20 and 21.

The elements, in general, are supported upon a base member 46 as shown in the FIGURE 1. At the discharge area of the document tray 32, the documents 30 are positioned against the sensing finger 44 and the pickup portion of a document feeder indicated generally at 48. In addition, the left edge of the documents 30 is positioned against a primary chamber 50 of a document separator generally indicated at 52. In addition, the document separator 52 comprises a secondary chamber 54. The document feeder 48 and the document separator 52 will be discussed in detail with reference to later figures. Means to inhibit the advancement of the documents are accomplished by an electro-mechanical actuator 56 mounted upon the base member 46, which actuator 56 has an extending arm 58 which passes between the bifurcated nozzles of the document feeder 48 and engages the stack of documents 30 to prevent their being fed by the document feeder 48. When feeding of the documents is desired, the actuator 56 will position the actuator arm 58 away from the documents and permit pick-up of the documents by the document feeder 48.

The document transport system comprises a pair of flexible belts 60 and 61 which are journalled in suitable pulleys and bearings upon the base member 46 for advancement of the documents. A stationary pulley 64 (although permitting rotational movement) is positioned juxtaposed the discharge area of the document tray 32, and supported by a bracket 66. The flexible belt 61 passes around a portion of the pulley 64 and continues on to form the document path or way. The belts 60 and 61 are supported by suitable pulleys to advance the documents 30 to the output pockets 68 and 70, as shown. Additional belts and pulleys are utilized to advance the documents to the output pocket 70.

As documents are advanced from the document tray 32 by the document feeder 48, and are positioned against the belt 61, a document timing cam 76, positioned immediately after the primary chamber 50 of the document separator 52, will advance toward the document and will assist in causing its progression to the point where both the belts 60 and 61 come together, which point is at the pulleys 78 and 80. As the documents are advanced, they are admitted to a multiple document detector 82 and one such document 30 is shown with its leading edge emerging from the multiple document detector 82. Also positioned along the document path is a magnetic reading head 84 whose output may be utilized to determine the sorting sequence of the documents. The electrical output from the magnetic reading head 84 does not form an integral part of the present invention and will not be described in detail; however, reference may be had to copending application Serial No. 114,784, entitled "Null Dependent Symbol Recognition," filed June 5, 1961, in the name of Medford D. Sanner, now Patent No. 3,212,058, and assigned to the same assignee. In addition, a light source 86 is positioned on one side of the document path while a photoelectric pick-up device 88 is positioned on the opposite side of the document path. The output from the pick-up device 88 may be utilized to signal various elements of the system, such as the deflecting members 72 and 74, that a document has arrived in the document path or way. In addition, the output from the pick-up device 88 may be utilized to inhibit the system at a predetermined time, or perform other functions as desired.

A pneumatic system schematic is shown in the FIGURE 2. The means for moving the air comprises a blower having an impeller 90 which is connected to a shaft 92 which may be driven by any suitable means. Air is drawn into the document feeder 48, the document separator 52 and the multiple feed detector 82 and discharged through the area indicated at 94. At the discharge area 94, the air takes two paths: a portion is discharged to the atmosphere as shown at 96; and, a portion is directed to the conduit 98 for application of the overhead air 100 and the under air 102. The overhead air 100 is directed to a connection (not shown) which is positioned above the documents 30 to cause a fanning action of the documents and thus tend to separate them. The under air 102 is directed against the underside of the documents (not shown) which, also, tends to separate the documents to assist in the proper positioning and serial feeding of the items.

The document feeder 48, the document separator 52 and the multiple feed detector 82 will be described in detail later in the specification; however, the schematic drawing of the FIGURE 2 will show how the entire pneumatic system operates and how the various elements operate as an integral system. The document feeder 48 has a tubular feeder nozzle 104 which is journalled within suitable bearings 106 and a feeder nozzle elbow 108. The end of the feeder nozzle 104 that engages the documents is bifurcated, having an upper port and a lower port. The feeder nozzle 104 oscillates in a longitudinal manner to pick up documents 30 and advance them to the transport system. Accordingly, the feeder nozzle 104 bears against the bearing surfaces 106 while following its prescribed path as dictated by the structure of FIGURE 14.

A feeder nozzle adapter 110 is of tubular construction and supports the bearings 112 which are in engagement with the feeder nozzle elbow 108. The bearings 112 permit the rotational movement between the elbow 108 and the adapter 110. As a document 30 closes off the intake area of the feeder nozzle 104, a valving arrangement indicated generally at 114, will open and permit air to be drawn in through the valve 114. The opening of the valve 114 will tend to stabilize the pressure within the feeder nozzle 102 by compensating for the inherent drop in pressure if the intake port (when covered over by a document 30) is closed off. A valve 116 is schematically shown to initially relieve the vacuum within the feeder nozzle 104 whenever documents are not being fed through the system.

As indicated earlier, the document separator 52 comprises a primary chamber 50 and a secondary chamber 54. The primary chamber 50 has an opening at its left side, the length of which opening extends to correspond with the minimum width of the documents to be processed. A grating 120 is positioned at the entrance port of the primary chamber 50 to prevent the documents 30 from being drawn into the chamber. The primary chamber 50 is of constricted construction at its right end where it is positioned slightly within the intake of the secondary chamber 54 of the document separator 52. The secondary chamber 54, constructed so that it has a converging entrance section followed by a diverging exit section, is directed to a restricted conduit which feeds into the ejector pump 118. In operation, air will be drawn into the primary chamber 50 as well as the secondary chamber 54. The construction is such that a much larger volume of air is drawn into the secondary chamber 54 than the primary chamber 50. When the entrance area of the primary chamber 50 is closed off by a document, then the entire flow is from the atmosphere into the secondary chamber 54. However, since the greater flow is from the atmosphere rather than through the primary chamber 50, the pressure within the secondary chamber 54 remains substantially constant. Thus, as documents successively close off the entrance area of the primary chamber 50, very little change in pressure takes place within the secondary chamber 54 and, since a substantially constant pressure is maintained within the chamber 54, the pulsations and undesirable pressure waves set up each time the port of the primary chamber 50 is closed by a document are minimized. In like manner, since the valving arrangement 114 in the feeder nozzle 104 will open each time a document closes off the entrance to the feeder nozzle 104, a substantially constant pressure is also maintained within the pneumatic system thus resulting in only minor fluctuations of pressure within the system.

A multiple feed detector 82, shown schematically in the FIGURE 2, draws air in around the document 30 and will sense any pressure changes which result from the feeding of one or more documents through the system. The discharge from the multiple feed detector 82 is conducted to a point immediately downstream of the smallest area of the secondary chamber 54 via the tube 122. The detailed operation of the multiple feed detector 82 will be reserved for reference to the FIGURES 10, 11 and 12.

The document feeder arm is shown in plan view in FIGURE 3. The function of the feeder arm is to transport documents seriatim from the stack of documents in the input hopper to the belt transport system. To be highly successful, the feeder arm must transport intermixed documents, without damage, of varying dimensions and weights, at high speed, one at a time, to the system. In general, the document feeder comprises two hollow cylindrical members which are concentric, one hollow member is formed within the other hollow member, for a portion of their lengths. Air is pumped through the hollow members and as one of the members is caused to rotate into engagement with the first document of the stack of documents, the pressure differential will cause the document to adhere to the bifurcated document feeding end of the feeder. As the document is secured to the document feeding end of the feeder, a great drop in pressure would occur within the feeder arm since the "pumping down" of the system continues. If the system were permitted to attain the lower pressure (a vacuum) caused by the closing off of the document feeder by a document, then a pressure wave or pulsation would be set up and transmitted through the system which produces many undesirable effects. However, in the present invention, means are employed to compensate for the drop in pressure by causing a valve in the document feeder arm to open at the instant that the document is grasped. Accordingly, air is now "dumped" into the inner chambers of the feeder arm in such a volume that the pressure waves generated are not so great in magnitude that the document falls off of the end of the document feeder. At the point where the document is transferred from the feeder arm to the flexible transport system, the valving arrangement on the document arm is fully opened so that the document may be removed from the feeder arm without tearing or mutilation.

As shown in FIGURE 3, the document feeder 48 comprises a cylindrical hollow feeder nozzle 104 having a portion formed at right angles to the main body of the nozzle. A second hollow cylindrical portion, the feeder nozzle elbow 108, also has a 90 degree extension; however, the 90 degree extensions of the nozzle 104 and the elbow 108 are positioned in perpendicular planes. One end of the elbow 108 is adapted to fit within a feeder nozzle adapter 110, which adapter is securely fastened to the base member 46 by any suitable means. Only rotational movement between the elbow 108 and the adapter 110 is permitted. The left end of the feeder nozzle elbow 108 which houses the cylindrical bearings 106 and its inner periphery assumes a greater diameter than its remaining portion. The feeder nozzle 104 is inserted within the enlarged portion of the elbow 108 in such a manner that the nozzle 104 will operate on the bearing surfaces 106.

An extending cam 124 is secured to the elbow 108. A cam follower arm 126 is positioned in a plane substantially parallel to the cam 124 and is pivoted about the pivot point 128. A circular cam follower spring 130 is positioned about the pivot point 128 is such a manner that the cam follower arm 126 is biased downwardly. Attached to the opposite end of the cam follower arm 126 and adapted for rolling engagement with the camming surface of the cam 124 is a cam follower roller 132. Connected to the intake area (the area where the air is drawn in) is a substantially rectangular upper feeder nozzle face plate 134 which supports the valving arrangement which valve compensates for the drop in pressure that would take place when the ports are closed off by a document. It will be noted from the FIGURES 5 and 6, that the feeding end of the feeder arm is bifurcated and that there is a lower feeder nozzle face plate 136 as well as the upper plate 134. Each of the face plates 134 and 136 are open to permit the entrance of the air and the grasping of the documents. A lip 137 is formed on the end of the feeder nozzle 104 which lip is drilled to permit the securing means 138 to pass through the nozzle 104 and position and retain the nozzle face plate 134 against the feeder nozzle 104. Additional securing means may be used as desired.

The detailed description of the feeder arm 48 will best be understood by reference to the FIGURE 3, the FIGURE 4 which is a sectional view taken along the lines 4—4 of the FIGURE 3, FIGURE 5 which is a sectional view taken along the lines 5—5 of the FIGURE 3, and the FIGURE 6 which is an end view taken along the lines 6—6 of the FIGURE 3. The FIGURE 4 shows only the upper port or feeding area since the lower port or feeding area is substantially identical to the upper port. The FIGURES 5 and 6 best show the hollow nature of the feeder nozzle 104 and the bifurcated nature of the feeding end of the nozzle 104. Since the upper feeding area adjacent the upper feed nozzle face plate 134 is substantially identical to the lower bifurcated portion of the nozzle 104 and which is positioned near the lower feeder nozzle face plate 136, reference will be had mainly to the upper area with a minimum of reference to the lower area.

As shown in the figures, a shaft 140 extends longitudinally within the upper face plate 134. The shaft 140 (and 140') is journalled at each end of the face plates 134 and 136 within suitable bushings 141 and has a coil spring 142 formed about an end of the shaft 140 which extends beyond the upper feeder nozzle face plate 134. The spring 142 biases shaft 140 to the left, and if the spring were shown in the FIGURE 5, the shaft 140 would be urged in a counter-clockwise direction.

Mounted upon the shaft 140 and within removed areas of the feeder nozzle 104 and the face plate 134 is a valve member 114. As shown in FIGURE 4, the valve member 114 is of substantially rectangular dimension and adapted to fit within a removed portion of the feeder nozzle 104. As shown in the FIGURES 4 and 6, the valve member 114 has a cross-section which will conform to the inside of the intake nozzle while in the open position. In general, the valve member 114 may be of various configurations according to the pressures utilized and the rate at which the pressure is to be equalized within the nozzle 104. The valve member 114 is secured to the shaft 140 by any suitable means such as the two bolts shown at 144.

As shown in the FIGURES 3, 4, 5 and 6, an upper valve crank 146 is secured to the shaft 140, which shaft 140 is square at its end and has an aperture to receive a pin and secure the valve crank 146 to the shaft 140. A drive link 148 is connected between the cam follower arm 126 and the upper valve crank 146. A lower shaft 140' has the lower valve crank 150 secured thereto. A valve connecting link 152 connects the upper valve crank 146 with the lower valve crank 150. As can be seen in the FIGURE 6, the lower portion of the feeder nozzle 104 has the elements substantially identical to the upper portion of the feeder nozzle such as the lower feeder nozzle face plate 136, shaft 140, coil spring 142, valve member 114, and securing means 144.

If the drive link 148, best shown in the FIGURES 3 and 5, is driven upwardly by the action of the cam follower roller 132 with the cam follower arm 126, the upper valve crank 146 will be rotated clockwise while the lower valve crank 150 will be rotated counterclockwise. This action will cause the upper and lower valve members 114 to open. The opening of the valve members 114 is in a time sequence to correspond to the closing off of the intake ports of the FIGURE 6 by a document. The intake ports in the FIGURE 6 are best shown by the designation 154 for the upper port and 156 for the lower port. A plurality of metal grids on fine wire grids 158 are formed across the opening of the ports 154 and 156 to prevent the documents from being drawn into and within the port areas.

As shown in the FIGURE 4, the valve 114 is shown in solid outline in its closed position and in dotted outline in its open position. The camming arrangement permits all positions of the valve 114 between the open and closed positions. Since the lower portion is substantially similar to the upper portion of the nozzle, only the upper portion is shown. It will be noted that at the entrance port 154, the sides of the chamber diverge until the point Z is reached. From the point Z on to the right, the feeder nozzle 104 assumes substantially parallel walls. At the entrance port 154, the pressure is shown generally by the curve Y of FIGURE 22. At 0° the document is grasped. On the curve Y, it is observed that the pressure decreases. At the top of the peak, the valve 114 starts to open and the pressure at 154 increases at approximately 160° of crank rotation, the valve is fully open and the pressure continues to increase. At 180° the document is removed from the entrance port 154 and the pressure then begins to decrease. The valve 114 then commences to close and the pressure returns to the original value as shown at 360°. The cycle now repeats.

The pressure at the point Z of FIGURE 4, is shown by the Z curve of FIGURE 22. The point or area Z is the point of principal pressure recovery and being located at the point where the divergence of the "jet" ends, this area Z sees little of the fluctuating pressure which occurs at the entrance port 154. From the curve Z of the FIGURE 22, it is observed that the pressure here is substantially constant. Thus, no (or a very small) pressure wave is set up and, thus, permits a smooth flow of fluid through the system.

As shown in the FIGURE 3, a shaft 160 is mounted within a bearing housing 162. The shaft 160 has a slot (not shown) formed at its upper end to receive a washer 164 for retaining the shaft 160 in position. As shown in the FIGURE 6, the shaft 160 extends through both the upper and the lower arms of the feeder nozzle 104 and its purpose is to connect with driving links (discussed in detail with reference to the FIGURES 13, 14 and 15) which provide the motion of the document feeder 48 to drive the feeder in its cycles for picking up documents from the stack, advancing the documents to the flexible transport means, and returning to its home position to repeat the cycle.

The document separator is shown in the FIGURE 7, which is a side elevation view and partly in section; in the FIGURE 8, which is a cross sectional view taken along the lines 8—8 of the FIGURE 7; and, FIGURE 9 which is a front view taken along the lines 9—9 of the FIGURE 7. The function of the document separator 52 is to assist in the serial feeding of the documents by preventing the multiple feeding of documents by holding all documents, as shown by the documents 30 in the FIGURE 8, at is intake port and permitting only the first document to be removed by the document feeder 48.

It will be noted that the document separator 52 is formed of a primary chamber 50 and a secondary chamber 54. One end of the primary chamber 50 is in engagement with the documents while the other end of the primary chamber 50 is directed to and feeds into the throat 182 of the secondary chamber 54. The primary chamber 50 is hollow which permits the passage of air through the member 50 and into the secondary chamber 54. There is continuous flow through the chamber 54 during operation of the system which produces a vacuum condition in the throat region 182. As the pressure is reduced in the secondary chamber 54, there are two entrances for air: the area in engagement with the documents and the area formed at the entrance 166 to the throat 182 of the secondary chamber 54. If the secondary chamber 54 having the entrance area 166 were not provided, a great drop in pressure would occur each time a document 30 closed off the entrance port to the primary chamber 50. If, however, air is permitted to enter the chamber 54 through the entrance area 166 as well as through the member 50, then when the entrance area of the primary chamber 50 is closed by a document, air may still enter the secondary chamber 54 through the entrance area 166 to the throat area 182. If the ratio of the air entering the entrance area 166 is large compared to the air entering the entrance to the primary chamber 50 when it is not closed off by a document, then when the entrance to the primary chamber 50 is closed off by a document, the difference in pressure that the chamber 54 "sees," is very small. The electrical analogy of the document separator 52 would be a pair of resistors in parallel where one resistor is of an ohmic value many times greater than the other. If the resistor having the large ohmic value is suddenly removed from the circuit, then the current through the low ohmic value resistor remains substantially unchanged.

As shown by the FIGURES 7, 8 and 9, the document separator is secured to the base member 45 in any suitable manner such as by the bolts 168, 169, 170 and 171. As shown in the FIGURE 8, a portion of the primary chamber 50 and the secondary chamber 54 form one side of the document tray 32. The same side of the document tray 32 is formed by an upright member 172 which continues on to form the document tray at the point where the secondary chamber 54 breaks away from the side of the document tray 32.

The primary chamber 50 has a geometrical configuration which is best shown in the three views, namely, FIGURES 7, 8 and 9. The port area, the area which is covered over by documents during certain portions of the cycle, has a series of grids or a grating 120 formed across the opening to prevent the entrance of the documents 30 into the port area. As air is drawn into the port area, the documents will adhere to the area near the port of the chamber 50 because of the fast flow of air around and near the documents and into the port area formed in the chamber 50. Accordingly, under ideal conditions, only the first document may be removed by the feeder arm 48. The primary chamber 50 has spacing means 174 formed within the hollow portion of the chamber 50 which serves to insure single document feeding. It will be noted that a sharp edge 175 constitutes one portion of the boundary of the entrance area whereas the opposite edge 177 is well rounded.

When a document is not over the entrance area to the chamber 50, the jet (of air) divides between both sides of the spacing means 174. As a document 30 starts to advance as shown in the FIGURE 8, the incoming air then forms a jet into the lower chamber near the rounded surface 177. As a result, the upper chamber near the sharp surface 175 becomes quickly evacuated to hold the documents in that position until singly removed by the feeder nozzle 104.

A threaded extension 176 mates with threaded portions at the exit end of the primary chamber 50 which extends into the entrance 166 to the throat 182 of the secondary chamber 54. The purpose of the threaded extension 176 is to provide an adjustment whereby the pressure at the intake area of the chamber 50 may be adjusted.

The secondary chamber 54 has an extending portion 178 which extends along the side of the document tray and mates with the primary chamber where the two members are secured together by the bolts 180. The entrance generally indicated at 166 and near the throat 182, is open to permit air from the atmosphere to be drawn into the throat 182 and the secondary chamber 54. The secondary chamber 54 is of restricted cross section at the point 182; consequently, the pressure of the air at this section is reduced below atmospheric pressure as the result of the increased velocity of the air into the throat.

The exit section of the primary chamber 50 which projects into the entrance region of secondary chamber 54 can be adjusted in order to obtain the optimum operating pressure within the primary chamber 50. Since the principal pressure drop in the primary chamber 50 occurs at the grids 120, the pressure downstream of the grids is substantially the same as the pressure at the exit of the primary chamber. Thus, whenever the entrance to the primary chamber is covered by a document, or documents, there is a minimum of pressure change within the primary chamber 50.

From the point 182 (the throat) within the secondary chamber 54 to the point 184, the cross sectional area is constant. However, from the point 184 to the end of the chamber 54, the cross sectional area increases which provides a gradual increase of the pressure and decreased velocity toward the ejector pump 118 of the FIGURE 2.

As shown in the FIGURES 7 and 8, a pipe 186 is secured to the right end of the secondary chamber 54 by any suitable means. An aperture 188 is formed in the side of the secondary chamber 54 near the point 184. The aperture is connected to the multiple feed detector 82 of the FIGURES 2 and 10 by means of tube 122. Since a greater volume of air is drawn into the throat 166 than through the aperture 188 from the multiple feed detector 82, then the closing off and the opening of the aperture 188 will have little effect on the pressure within the secondary chamber 54. Thus, the stability of the document separator 52 has been established by eliminating or substantially reducing the pulsations and pressure waves set up as a result of widely varying pressures due to the movement of the documents over the ports of the system.

The document doubles detector is shown in the FIGURES 10, 11 and 12. The detector 82 is formed of two substantially U shaped members 190 and 192. The U is closed at one end and has a sealing member 202 and end plate 194 secured by any suitable means to its open end so that an enclosed chamber is formed by the joining of the members 190 and 192 except for the slot 196 which is reserved for the passage of the document 30. The members 190 and 192 may be secured to the base member 46 by any suitable means such as the bolts, as shown.

The area within the U area is not entirely open but has an upper portion 198 and a lower portion 200 extending therefrom and across to a sealing member 202 which forms a tight seal against the members 190 and 192 when the end plate 194 is held securely in place. Formed between the portions 198 and 200, is an area 204. The area or aperture 204 opens to the left chamber 206 through a nozzle 210 and to the right chamber 208 through a nozzle 212. It will be noted that each of the nozzles 210 and 212 are gradually rounded at 214 and are formed very sharply at 216. The particular configuration shown of the nozzles 210 and 212 serves to provide in the chamber 204, a fast pressure change if two or more documents are fed which is quickly detected by a device such as a pressure switch 218 which is connected to the inner chamber 204 via the tubing 220. Thus, increased sensitivity and response time results.

In operation, and without a document present within the slot 196, air is drawn into the slot 196 and divided equally between the chambers 206 and 208 to exit through the connection 122. When a single document is within the slot 196, it will close off one of the chambers 206 or 208 and not permit air to flow in the upper portions thereof. For the purposes of this discussion, we will assume that the document 30 moves slightly to the right in the slot 196 and closes off the chamber 208. The air path is now through the chamber 206 to the outlet tube 122; however, a secondary path exists from the chamber 206 through the chamber 204, into the chamber 208, through the bottom of the chamber 208 and to the exit port 122. The instrument coupled to the switch 218 will be adjusted so that the closing off of either of the chambers 206 or 208 will not indicate the passage of multiple documents. It will be noted that as the air passes from the chamber 206 into the chamber 204, its pressure will be reduced and its velocity increased as it passes through the nozzle 210. When the air arrives within the chamber 204, the pressure is less since the chamber 204 is of abruptly larger cross-section than the sharply defined portion 216 of the nozzle 210.

In the event that two or more documents pass through the slot 196, both the chambers 206 and 208 will be closed off. Since the pumping of the system continues through the exit tube 122, a tremendous rush of air from the chamber 204, through the nozzles 210 and 212 into the chambers 206 and 208, respectively, takes place. Due to the particular geometrical configuration of the nozzles 210 and 212, the multiple feeding of the documents is quickly detected by the pressure switch 218, whose output may be utilized to divert these documents to a reject hopper or to inhibit the feeding of subsequent documents.

Figure 14:
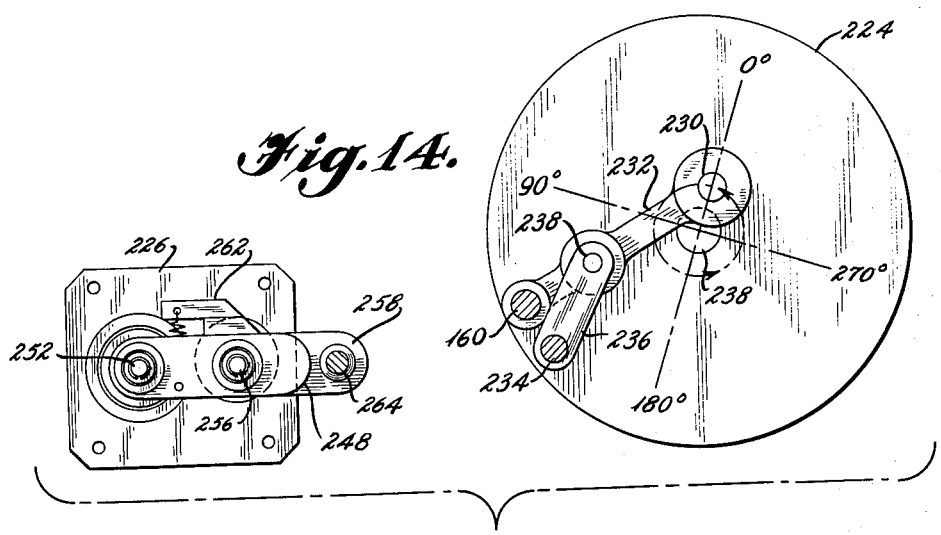
FIGURE 14 is a plan view taken along the lines 14—14 of the FIGURE 13.

The mechanism for moving the document feeder 48 through its cycle of removing a document from the stack and delivering it to the flexible feed belts is shown in the FIGURES 13 and 14. Mounted below the base member 46 is a second base member 222. The base member 222 supports a flywheel 224, a supporting means 226 and various pulleys, shafts, etc. as shown in FIGURE 13. The center of the pulley 224 is shown at 228. An upright member 230 is secured to and slightly off center of the flywheel 224. A connecting arm 232 is journalled about the upright member 230 and connected to the shaft 160, which shaft is secured through bearings to the feeder nozzle 104 of the document feeder 48. A pin 234 is drilled and secured into the base member 46 as shown, and has a link 236 extending therefrom. The link 236 is secured to the connecting arm 232 at the junction 238. The link 236 may be of a clevis arrangement as shown in the FIGURE 13.

With reference to the FIGURES 14 and 15, the motion of the feeder arm 48 will now be described. With the elements of the FIGURE 14, and more specifically those mounted above the flywheel 224, in the position as shown, the shaft 116 would be at the point D (0°) of the FIGURE 15. At this point, a document would be picked up by the feeder nozzles. As rotation of the flywheel continues as shown by the arrow in the FIGURE 14, the shaft 160 will follow a course from D to E (180° rotation) which is a substantially straight line motion. Between the points D and E the valving arrangement 114 would start to open and the document would be released at E (180°) and delivered to the flexible belt system. As rotation of the flywheel 224 continues, the shaft 160 follows the path shown by the curved portion F and returns to the point D where succeeding documents are picked up. The element or timing mechanism 226 of the FIGURE 14 and shown in position in the FIGURE 13, supports the document timing cam 76 and cooperates with the mechanism to cause the release of the document from the feeder nozzles as the shaft 160 reaches the point E of the FIGURE 15. The timing cam assembly 226 will be discussed subsequently.

The timing mechanism 226, shown at the left of the FIGURE 14, is shown in detail in the FIGURES 16 and 17. The purpose of the document timing cam 76 is to engage the side of the document at the precise point in time when the document feeder is substantially fully extended, and force the document into engagement with the flexible belt and cause the release of the document from the feeder nozzles. To accomplish this action, the document timing cam pulley 76 follows a path as shown in the FIGURE 18. The element 226 is drilled out to support a pair of bearings 240 for a shaft 244 and a second pair of bearings 242 for a shaft 246. The shafts 244 and 246 are upright and parallel. A substantially U-shaped member 248 is supported at its closed end by the bearings 250 and off centered shaft 252, with respect to the shaft 244. Midway along the member 248, are the bearings 254 which also support an off centered shaft 256, which is off center with respect to the shaft 246. Secured within the clevis formed by the member 248 and having the shaft 256 formed therethrough, is an arm 258 which is resiliently mounted by a spring 260 being connected to an extension 262 of the arm 258. Extending from the free end of the arm 258 is a shaft 264 which supports at its upper end thereof, the timing cam roller 76.

As stated earlier, the roller or timing cam pulley 76 will be driven in a path as described by the FIGURE 18. To demonstrate the cooperation between the shaft 160 and the shaft 264 of the FIGURES 13 and 14, reference will be had to the FIGURES 15 and 18. As the shaft 116 leaves the point D, the shaft 264 will leave the point M. At the point E where the document is to be released, the shaft 264 has arrived at the point N at which time the roller or pulley 76 on the shaft 264 forces the document against the flexible belt 61 during the time from N to P. During this time, the shaft 160 traverses from the point E to the point F. For the remainder of the cycle, the shaft 160 travels from the point F to the point D while the shaft 264 follows the path from P back to the point M. The cycle is now ready to repeat and continue the subsequent feeding of documents.

The document feeding mechanism is shown in the FIGURE 19. The documents are supported in the tray 32 in an inclined manner. At the point 266 the documents 30 are moved to a horizontal plane and as the documents pass over the junction 266 formed by the intersection of the sloped plane and the horizontal plane they are fanned apart as shown in the FIGURE 19. This "fanning action" tends to separate the documents and prevent the multiple feeding of documents. As the documents arrive at the position in the front of the stack, they are ready to be picked up by the nozzles of the feeder nozzle 104 and transported to the flexible belt system.

The sensing mechanism for causing the advancement of the documents is shown in the FIGURES 19, 20 and 21. A sensing finger 44 is positioned slightly above the base member 46 and in the path to be engaged by the documents. The sensing finger 44 is pivoted about the point 268 and is coupled to an arm 270 by a pin 272. The motion of the arm 270 is transferred to a movable arm 274 through an upright shaft 276. The movable arm 274 forms part of the circuit of a transformer 278. The movable arm of the transformer 278 pivots about a shaft 280 which is contained within the upright member 276 and secured to the base member 46. As the documents are forced against the sensing finger 44, the motion will be transmitted to the movable arm 274 which will cause a varying flux in the transformer 274 and consequently a reduced output on the leads of the transformer 278. As a result, the driving means coupled to the chain drive mechanism 40 will be reduced in speed. As the feeder nozzle 104 removes documents from the feed tray, the force against the sensing finger 44 will be reduced which will now permit the movable arm 274 to assume a position closer to the core of the transformer 278. This motion will cause an increased output from the transformer 278 which will increase the speed of the chain mechanism 40 to advance documents to the feeder arm.

To more fully understand the feeding and processing operations of the system, reference will be had to the drawings for a detailed description of operation.

We will assume that the document tray 32 of the FIGURES 1 and 19 has been loaded with documents and that the first document of the stack is resting against the sensing finger 44 of the FIGURES 19 and 20. In addition, the actuator arm 58 of the electromechanical actuator 56 of the FIGURE 1 will be resting against the first document to prevent its being fed when the blower system is started.

The flexible belt document transport system of the FIGURE 1 and the blower system of the FIGURE 2 are started. From the FIGURE 2, it will be noted that air will now be drawn in and around the grids or grating 120 of the primary chamber 50 of the document separator; into the entrance 166 of the secondary chamber 54 of the document separator 52; into the chambers 206 and 208 of the multiple feed detector 82; and, into the entrance ports of the feeder nozzle 104 which are normally in engagement with the document 30 when a document is to be transported from the feed tray to the document transport system. The valving arrangement 114 of the feeder nozzle 104 would be closed. Since the system has not commenced operation, it may be desirable to close the valve 116 of the FIGURE 2. In that event, air would normally not be drawn to the feeder nozzle 104 until the valve 116 is opened just prior to the feeding operation.

The blower 90 discharges a portion of the air to the atmosphere through the conduit 96 and a portion of the air to the atmosphere through the conduit 96 and a portion through the conduit 98 to the overhead air 100 and the under air 102. The overhead air 100 is directed down onto the edges of the documents (not shown) while the under air 102 is dircted upwardly on the lower edge of the documents (also not shown).

The feeder nozzle moving mechanism and the document timing cam of the FIGURE 14 are also started. At this point then, the blower system is operating, the flexible belt document transport system has been started, documents are available in the document tray 32, and the feeder nozzle moving mechanism is in operation; however, documents will not be fed until the electromechanical actuator 56 of the FIGURE 1 moves the actuator arm 58 away from the first document. In addition, before documents may be fed, the valve 116 of the FIGURE 2 must be opened in the event that the valve 116 was closed during non-feeding operations.

Th documents 30 will be held against the entrance area or port of the primary chamber 50 of the document separator 52 as shown in the FIGURE 8. Only the first document will be permitted to assume a position in front of the entrance port while the remaining documents in the stack will be positioned as shown.

The system is now ready for operation. The electromechanical actuator 56 of the FIGURE 1 is actuated to cause the actuator arm 58 to move away from the first document and permit the pick-up of the first document by the entrance ports 154 and 156 of the feeder nozzle 104. As the document is drawn against the entrance ports of the feeder nozzle 104, the feeder nozzle 104 is in the position shown in the FIGURES 14 and 15, that is, at the point D or zero degrees. The feeder nozzle 104, driven by the mechanism of the FIGURES 13 and 14, will cause the document 30 to advance to the point E, depicted in the FIGURE 15. As the document is advancing from the point D to the point E, the cam follower roller 132 of the FIGURE 3 will ride outwardly (to the left) on the cam 124. This operation will move the drive link 148 upwardly which will rotate the shaft 140 clockwise as shown; in the FIGURE 4. As shown in the FIGURE 22, the valve 114 starts to open and the air admitted, tends to equalize the pressure within the feeder nozzle. The pressures at the face plates 134 and 136 and the pressure within the feeder nozzle at the point Z, were discussed previously with reference to the FIGURE 22. The graph of the FIGURE 22 which is pressure versus crank rotation, is not drawn for a particular pressure since the pressure will be dependent upon the pressure that one desires to maintain within the system.

As the cam follower roller 132 advances to its furtherest point of travel, (which is near the left end of the cam 124) the crank rotation of the FIGURE 14 will be at approximately 180 degrees and the pressures will be as shown by the FIGURE 22. After the first document was removed from the document separator 52 of the FIGURE 8, the second document would then be positioned in front of the entrance port of the primary chamber 50. In addition, the document sensing means of the FIGURES 19, 20, and 21 would be operating to advance documents at the rate in which they are removed.

Figure 15:
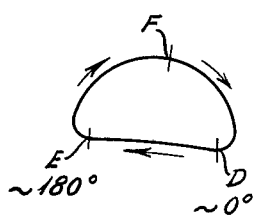
FIGURE 15 is a diagram showing the path of the pin 160 of the FIGURE 14.

As the feeder nozzle 104 reaches the point E of the FIGURE 15, the document timing cam pulleys 76, best shown in the FIGURES 1 and 13, will have progressed from the point M to the point N of the FIGURE 18 and at the point N will force the document 30 against the flexible belt 61. This operation causes the document 30 to be removed from the entrance ports of the feeder nozzle 104 and transported to one of the output pockets 68 and 70 by the flexible belt system.

As the document is advanced by the flexible belt system, it is passed within the slot 196 of the multiple feed detector 82, best shown in the FIGURE 10. As set forth earlier in the specification, a single document will close off either the chamber 206 or the chamber 204 but not both. Accordingly, the pressure change caused by the blocking off of one of the chambers within the chamber 204 will not be detected by the means 218 of the FIGURE 12. However, if two or more documents are inadvertently fed by the feeder nozzle 104, then both the chambers 206 and 208 will be closed off and no longer draw air from the atmosphere. This operation causes an abrupt pressure change within the chamber 204 which is quickly detected by the sensing device 218. The output from the sensing device 218 may be utilized to inhibit the sorting operation or to direct those documents to a reject hopper.

Thus, the cycle of operation of the system has been described. The operation now repeats until all documents are sorted. The sorting routine may be determined by the output from the magnetic reading head 84 and the photo pick-up device 88, as determined by the aforementioned copending application.

The document feeder of the present invention is comprised of an extending bifurcated vacuum operated arm which picks up documents through its entrance ports and follows a substantially D-shaped path. One end of the document feeder arm contains a plurality of ports through which air is passed so that the arm may engage and hold a document. As soon as a document adheres to the feeder arm, a substantial drop in pressure would take place within the arm which would set up a pressure wave which produces many undesirable effects. In the feeder arm of the present invention, a valving arrangement is coupled to the feeder arm which will cause valves to open at the moment that the document is grasped so that auxiliary ports are now available to continue the flow of air through the feeder arm. The pressure within the feeder arm is now stabilized and the amount of air permitted to enter the auxiliary ports is not so great that the document falls from the entrance ports but is of a sufficient magnitude that the document is retained on the face of the feeder arm while the pressure is maintained substantially constant within the feeder arm.

The feeder arm follows the straight-line portion of the D motion and advances the documents to the flexible belt transport system. During this advancement, the documents are caused to pass in front of a document separator. The document separator serves to permit only a single document to pass into the transport system. Multiple documents are held by the document separator and will be picked up serially during succeeding feeding cycles. A similar problem occurs within the document separator as within the document feeder when its ports are closed off. When the ports in engagement with the document are closed off, a great drop in pressure occurs. These great drops in pressure (increased vacuum) causes pulsations and waves to be set up in the system which cause vibration, decrease the stability, increase the noise level and in general decrease the efficiency of the system. The document separator is constructed of a main chamber of such physical dimensions to produce an acoustical resonance frequency which is many times greater than the frequency of the document processing rate and a secondary chamber which is open to the atmosphere to permit the intake of air. While a substantial decrease in pressure takes place within the primary chamber in engagement with the documents, the pressure in the secondary chamber remains substantially constant since the air flow into the secondary chamber is much greater than that into the primary chamber. It is this constant pressure in the secondary chamber which the blower of the system "sees."

As the documents advance along the document path, they are directed through a multiple item detector which detects for the presence of one or more documents. An arrangement of ports, nozzles and chambers within the multiple item detector will permit fast response if multiple items are fed.

The present invention may be embodied in other specific forms without departing from the spirit and essential characteristics of the invention. The present embodiment is, therefore, to be considered in all respects as illustrative and the scope of the invention being indicated by the appended claims rather than by the foregoing description. All changes which come within the meaning and range of the equivalency of the claims are therefore intended to be embraced herein.

I claim:

1. A multiple item detector of the vacuum type comprising a substantially rectangular hollow chamber, a slot formed in the side of the detector and extending into said chamber, said slot adapted to receive a succession of documents, pressure outlet means formed in the side of the detector at a point opposite to said slot, spacing means substantially centered within said chamber so as to form a pair of passageways from said slot to said outlet, and a secondary chamber formed in said spacing means for joining said pair of passageways, nozzle means positioned between each of said pair of passageways and the entrances to said secondary chamber, said nozzles means being converging in the area leading from said passageways and sharply formed at the area within the secondary chamber.

2. The combination as defined in claim 1 including pressure detecting means coupled to said secondary chamber for indicating when said passageways are closed off.

3. A multiple document detector comprising a substantially closed fluid chamber, said chamber including three fluid passages, first and second passages respectively cooperating with first and second ports opening to a document way along which documents are selectively passed, said first and second passages cooperating with at least one pressure source, said ports and said pressure source located at opposing ends of said first and second passages, third passage means cooperating with said first and second passages at points located intermediate the respective ports and said pressure source, each end of said third passage incorporating a nozzle-orifice element with the nozzle cooperating with the associated one of said first and second passages and with the orifice cooperating with the interior volumetric chamber of said third passage whereby accurate control of the pressure within said third passage can be controlled as a function of the pressures applied via said first and second passages, and pressure switch means cooperating with said third passage to detect and indicate a predetermined pressure condition in said third passage.

4. A multiple item detector of the vacuum type comprising a substantially rectangular hollow chamber, a slot formed in the side of the detector and extending into said chamber, said slot adapted to receive a succession of documents, pressure outlet means formed in the side of the detector at a point opposite to said slot, spacing means substantially centered within said chamber so as to form a pair of passageways therearound from said slot to said outlet, each of said passages having a plurality of separate volumetric chambers therein, and a secondary chamber formed in said spacing means for joining said pair of passageways, nozzle means positioned between each of said pair of passageways and the entrances to said secondary chamber, said nozzles are converging in the area leading from said passageways and sharply formed at the area within the secondary chamber, and pressure detecting means coupled to said secondary chamber for indicating when said passageways are closed off.

5. A multiple document detector comprising a substantially closed fluid chamber, said chamber including three fluid passages, first and second passages respectively cooperating with first and second ports opening to a document way along which documents are selectively passed, said first and second passages cooperating with at least one pressure source, said ports and said pressure source located at opposing ends of said first and second passages, said first and second passages having different portions with different cross-sectional areas such that pressure variations are exhibited along said passages, third passage cooperating with said first and second passages at points located intermediate the respective ports and said pressure source, said third passage having substantially constant cross-sectional area throughout its length, each end of said third passage incorporating a nozzle-orifice element with the nozzle cooperating with the associated one of said first and second passages and with the orifice cooperating with the interior volumetric chamber of said third passage whereby accurate control of the pressure within said third passage can be controlled as a function of the pressures applied via said first and second passages.

6. A multiple item detector of the vacuum type comprising a substanially rectangular hollow chamber, a slot formed in the side of the detector and extending into said chamber, said slot adapted to receive a succession of documents, pressure outlet means formed in the side of the detector a a point opposite to said slot, substantially polygonal spacing means substantially centered within said chamber, said spacing means having different sides thereof spaced differently from the walls of said chamber so as to form a pair of pasageways therearound from said slot to said outlet each of which passageways have varying cross-sectional areas along the length thereof, and a secondary chamber formed in said spacing means for joining said pair of passageways, said secondary chamber having substantially constant cross-sectional area, nozzle means positioned between each of said pair of passageways at portions thereof having large cross-sectional area and the entrances to said secondary chamber, said nozzles being converging in one direction and sharply formed in the other direction.

7. A multiple document detector comprising a substantially closed fluid chamber, said chamber including three fluid passages, first and second passages respectively cooperating with first and second ports opening to a document way along which documents are selectively passed, said first and second passages cooperating with at least one vacuum source, said ports and said vacuum source located at opposing ends of said first and second passages, and third passage means cooperating with said first and second passages, at points located intermediate the respective ports and said vacuum source, each end of said third passage incorporating a nozzle-orifice element such that accurate control of the pressure within said third passage can be controlled as a function of the pressures applied via said first and second passages.

8. The document detector recited in claim 7 including pressure switch means cooperating with said third passage to detect a predetermined pressure condition therein, said pressure condition in said third passage being a function of the pressure applied at the ends thereof in response to the closing of said ports by documents being passed along said document way.

9. A multiple document detector comprising a substantially closed fluid chamber, said chamber including three fluid passages, first and second passages respectively cooperating with first and second relatively small ports opening to a document way along which documents are selectively passed, said first and second passages cooperating with at least one pressure source, said ports and said pressure source located at opposite ends of said first and second passages, each of said first and second passages comprising three interrelated but distinct chambers, the first chamber of each of said first and second passages cooperating with the associated port and comprising a diffuser chamber having a cross-sectional area which expands and diverges away from the port, the third chamber of each of said first and second passages cooperating with said pressure source and comprising a chamber having a substantially constant cross-sectional area, and the second chamber of each of said first and second passages cooperating with and disposed between said first and third chambers comprising a substantially constant cross-sectional area which is larger than the cross-sectional area of said second chamber, third passage means cooperating with said first and second passages at said second chambers, each end of said third passage incorporating a nozzle-orifice element with the nozzle cooperating with the associated one of said first and second passages and with the orifice cooperating with the interior volumetric chamber of said third passage whereby accurate control of the pressure within said third passage can be controlled as a function of the pressures applied via said first and second passages, and pressure switch means cooperating with said third passage to detect a predetermined pressure condition in said third passage.

10. A multiple document detector comprising a substantially closed fluid chamber, said chamber including three fluid passages, first and second passages respectively cooperating with first and second relatively small ports opening to a document way along which documents are selectively passed, said first and second passages cooperating with at least one pressure source, said ports and said pressure source located at opposing ends of said first and second passages, each of said first and second passages comprising three interrelated but distinct chambers, the first chamber of each of said first and second passages cooperating with the associated port and comprising a diffuser chamber having a cross-sectional area which expands and diverges away from the port, the third chamber of each of said first and second passages cooperating with said pressure source and comprising a chamber having a substantially constant cross-sectional area, and the second chamber of each of said first and second passages cooperating with and disposed between said first and third chambers comprising a substantially constant cross-sectional area which is larger than the cross-sectional area of said second chamber, and third passage means cooperating wih said first and second passages at said second chambers.

11. Document separator means of the vacuum type comprising a primary chamber having a substantially rectangular port area at one end equal in height to the width of the smallest document to be separated, said primary chamber assuming a hollow cylinder at its other end, and a secondary chamber pneumatically coupled to the other end of said primary chamber and adapted to be evacuated and having an opening in excess of that required for the pneumatic coupling between the chambers, said hollow cylinder of the primary chamber comprising means to vary the degree of pneumatic coupling between the chambers, said opening to said secondary chamber comprising a converging nozzle.

12. The combination as defined in claim 11 wherein said opening, at the point within the secondary chamber and beyond the converging nozzle, forms a diverging nozzle.

13. A document separator comprising first and second cooperating chambers, a pressure source cooperating with one end of said second chamber, said first chamber comprising a substantially hollow structure having a constant cross-sectional area for fluid flow therethrough whereby substantially constant pressure is maintained throughout, said first chamber having a substantially flattened, rectangular cross-section at one end thereof and a substantially circular cross-section at the other end thereof with a smoothly tapering transitional cross-section whereby said constant cross-sectional area is maintained, said second chamber comprising two diverging sections joined together at the smaller ends thereof by a right circular cylindrical portion, the large ends of each of said diverging sections forming the ends of said second chamber, said other end of said first chamber loosely cooperating with the other end of said second chamber whereby fluid flow in said second chamber due to said pressure source may be effected through said first chamber and through the opening provided by said loose cooperation between said first and second chamber.

14. The document separator recited in claim 13 wherein said other end of said first chamber comprises an elongated tubular section which extends into the larger end of said diverging section to cooperate therewith, said tubular section being substantially smaller in diameter than said larger end of said diverging section of said second chamber.

15. A document separator comprising first and second cooperating chambers, a pressure source cooperating with one end of said second chamber, said first chamber comprising a substantially hollow structure having a constant cross-sectional area for fluid flow therethrough whereby substantially constant pressure is maintained throughout, said first chamber having a substantially flattened, rectangular cross-section at one end thereof and a substantially circular cross-section at the other end thereof with a smoothly tapering transitional cross-section whereby said constant cross-sectional area is maintained, said other end of said first chamber loosely cooperating with the other end of said second chamber whereby fluid flow in said second chamber due to said pressure source at said one end thereof may be effected through said first chamber and through the opening provided by said loose cooperation between said first and second chambers.

16. A document separator comprising first and second cooperating chambers, a pressure source cooperating with one end of said second chamber, said first chamber comprising a substantially hollow structure having a constant cross-sectional area for fluid flow therethrough whereby substantially constant pressure is maintained throughout, said first chamber having a substantially flattened, rectangular cross-section at one end thereof and a substantially circular cross-section at the other end thereof with a smoothly tapering transitional cross-section whereby said constant cross-sectional area is maintained, said one end comprising a port against which documents may be drawn, the external surface of said chamber adjacent said port having a rounded edge, and spacing means disposed in said first chamber adjacent said port at said one end to divide the fluid flow through said first chamber, said other end of said first chamber loosely cooperating with one end of said second chamber whereby fluid flow in said second chamber due to said pressure source may be effected through said first chamber and through the openings provided by said loose cooperation between said first and second chambers.

17. The document separator recited in claim 16 wherein said rounded edge of said external surface of said first chamber is disposed adjacent to means for supplying documents to be separated, and said port having two elongated opposed internal surfaces, with said spacing means disposed substantially therebetween, one of said internal surfaces being rounded and the other of said internal surfaces defining a sharp edge, said sharp edge surface being contiguous with said rounded edge of said external surface.

18. A document pickup device for a document sorting system comprising, a pressure source, and a document feeder, said feeder cooperating with said pressure source at a rotatable junction, said feeder comprising an elbow member having one end fixed to said rotatable junction, a port member having at least one port at one end thereof, the other end of said port member cooperating with the other end of said elbow member in a telescoping relationship, means for driving said port member in a substantially D-shaped path where the flattened portion of the path parallels a docket feed path, said port and elbow members cooperating in said telescoping relationship when said port member is driven along said D-shaped path, said elbow member rotating around said junction when said port member is driven along the curved portion of said D-shaped path, and a selectively operable vent located adjacent the port end of said port member, said vent comprising an aperture in said port member and a shutter pivotally mounted in said aperture, said shutter being spring loaded to normally maintain said aperture in the closed condition, cam means connected to said elbow member at said other end thereof, cam follower means connected to said shutter, said cam follower means cooperating with said cam means to provide a camming operation thereon when said elbow and port members cooperate in said telescoping relationship, said shutter being driven to a position whereby said aperture is opened during said camming operation such that substantially constant pressure is maintained within said feeder device even if said port in said port member is closed by a document being fed.

19. A document sorting system comprising, a single pressure source, a document feeder device, said feeder device cooperating with said pressure source at a rotatable junction, said feeder comprising an elbow member having one end fixed to said rotatable junction, a port member having at least one port at one end thereof, the other end of said port member cooperating with the other end of said elbow member in a telescoping relationship, means for driving said port member in a substantially D-shaped path where the flattened portion of the path parallels a docket feed path, said port and elbow member cooperating in said telescoping relationship when said port member is driven along said D-shaped path, said elbow member rotating around said junction when said port member is driven along the curved portion of said D-shaped path, and a selectively operable vent located adjacent the port end of said port member, said vent comprising an aperture in said port member and a shutter pivotally mounted in said aperture, said shutter being spring loaded to normally maintain said aperture in the closed condition, cam means connected to said elbow member at said other end thereof, cam follower means connected to said shutter, said cam follower means cooperating with said cam means to provide a camming operation thereon when said elbow and port members cooperate in said telescoping relationship, said shutter being driven to a position whereby said aperture is opened during said camming operation such that substantially constant pressure is maintained within said feeder device even if said port in said port member is closed by a document being fed, document separator means disposed adjacent said document path and said feeder device for insuring the feeding of a single document by said feeder device, and multiple document detector means disposed adjacent said document path for detecting the spurious feeding of a plurality of documents, said documents separator means and said multiple document detector cooperating with said single pressure source such that a single pressure system is provided, said selectively operable vent in said feeder device being operable to inhibit spurious fluctuations and reflections in said single pressure system thereby preventing improper operation of said document sorting system.

20. The document sorting system recited in claim 19 including document supplying means disposed adjacent said feeder device, and means cooperating with said single pressure system for causing the separation of documents supplied by said document supplying means prior to the operation thereon by said feeder device.

References Cited by the Examiner

UNITED STATES PATENTS

| | | | |
|---|---|---|---|
| 2,994,528 | 8/1961 | Hull | 271—56 |
| 3,079,147 | 2/1963 | Childs | 271—12 X |
| 3,184,230 | 5/1965 | Rolon | 271—11 |
| 3,193,283 | 7/1965 | Smith | 271—47 |

ROBERT B. REEVES, *Primary Examiner.*

J. N. ERLICH, *Assistant Examiner.*